May 22, 1973  C. W. ERWOOD  3,734,836
METHOD OF MAKING AN ELECTROCHEMICAL TIMING MEMBER
Original Filed Jan. 31, 1958                     2 Sheets-Sheet 1

United States Patent Office 3,734,836
Patented May 22, 1973

3,734,836
METHOD OF MAKING AN ELECTROCHEMICAL TIMING MEMBER
Charles William Erwood, 28 Canonsfield Road, Welwyn, England
Original application Jan. 31, 1958, Ser. No. 712,588, now Patent No. 3,475,571, dated Oct. 28, 1969. Divided and this application Sept. 21, 1960, Ser. No. 57,585
Int. Cl. C23b 5/48
U.S. Cl. 204—15                              1 Claim

ABSTRACT OF THE DISCLOSURE

The method of forming an electrochemical tubular member for use in an electrochemical timing device comprises electrodepositing successive layers of copper, gold, and silver upon a cylindrical former member; placing a non-conductive ring over a circumferential section of the deposited material; successively electrodepositing silver and gold; removing the non-conductive ring and electrodepositing lead. When used in an electrochemical timing device wherein the metal on the tubular member is dissolved, rupture occurs at the circumferential section to initiate a desired action.

---

This application is a division of application S.N. 712,588, filed Jan. 31, 1958, now Pat. No. 3,475,571, dated Oct. 28, 1969.

The present invention relates to devices for interposing a predetermined delay time between the occurrence of an initiating action or signal and a resulting action.

Delay time controlling devices, in which the delay time is introduced by having some part of a retaining member made of a material which is gradually dissolved in a solvent by chemical action until it disrupts, (thereby releasing an actuating member for example), are unreliable in operation and the delay time cannot be controlled with any great degree of accuracy.

An object of the present invention is to provide a reliable device which is controlled by electrochemical action and in which an action may be initiated after an accurately determined delay time which can be preselected to any value between wide limits which may be as short as one minute or as long as a year.

An electrochemical delay time controlling device according to the invention comprises a timing member which is arranged to be the anode in an electrolytic cell and is made of metals which pass into solution when an electric current is passed through the electrolyte, and having a weak section at which it is arranged to break after a consistent amount of electrolytic action, to initiate a desired action.

The accuracy of timing of such a device is greatly improved by forming the timing member of at least two layers of different metals of which a first layer, which is nearer to the electrolyte in operation consists of an accurately predetermined mass of the more electro-positive metal and a second layer further from the electrolyte consists of the more electro-negative metal and has a weak section which is of accurately known thickness. When the device is operated, it has been discovered that, if certain combinations of metals are chosen, the first layer will be completely or, at least, almost completely removed before the second layer is attacked and the time taken for its removal will be accurately proportional to the current passed through the electrolyte. Inaccuracy in the delay time will therefore be largely confined to the time taken for the second layer to break and by making this latter time small in comparison with that required to remove the first layer, an enhanced overall accuracy of timing can be achieved. Examples of combinations which will function in the above manner are a first layer of lead in conjunction with a second layer of copper or silver and a first layer of copper or nickel in conjunction with a second layer of silver.

Accuracy of timing is still further improved by confining the electrolytic action on the second layer to the weak section. This may be done by interposing, between the two layers, a third layer of an even more electro-negative metal, for example a noble metal such as gold, platinum or palladium, covering the second layer except at the weak section, thereby stopping the electrolytic action except at the unprotected weak section.

By a more electro-positive metal is meant one which is higher in the electro-chemical series and which will electrolyse in preference to a more electro-negative metal. The most electro-positive metals are the alkali metals while the most electro-negative are the noble metals. Although any one of several pairs of metals may be used to form the first and second layers, a preferred pair consists of lead and silver, while the third layer is preferably made of gold.

It is desirable that the density of the current acting on the surface of the timing member should not change considerably during the course of the electrolytic action and the shape of the timing member is therefore preferably arranged to present a substantially constant surface area to the electrolyte throughout the action.

The timing member may accordingly be, for example, in the shape of a flat plate or disc forming one end of the electrolytic cell, but, preferably, the member is in the form of a thin tube against the closed end of which an actuating member is held in a constrained position. The tube in accordance with a feature of the invention consists of at least two layers of different metals, one within the other, the outermost layer consisting of an accurately predetermined mass of one metal and an inner layer being made of a more electro-negative metal and having a weak circumferential section, the tube being arranged to break after the whole of the outermost layer and a smaller amount of the inner layer have been removed by electrolytic action.

A method of manufacture of a timing member in accordance with the invention comprises successively electro-depositing layers of metals on a former and forming a weak section in a selected layer by shielding the section of that layer by a non-conductive shield which seals the section from the electro-depositing action while additional metal is deposited on the remaining exposed portion of the member, the outermost layer of metal being subsequently deposited until it contains an accurately known weight of metal.

When the timing member takes the form of a thin tube the metals may be successively deposited on a cylindrical former and a weak circumferential section formed in a selected inner layer by encircling a circumferential section of that layer by a non-conductive ring which seals off the section while further metal is deposited on the exposed portion of the surface.

A timing member made by electro-deposition is more satisfactory than one made by casting or rolling the metals. Cast metal has too coarse a grain structure and would be more liable to break up during electrolysis as will be described. A rolled member tends to have local internal stresses and strains which might cause the member to break prematurely. The electro-deposited member has a good fine-grained structure and is free from local stresses and therefore gives more consistent delay times than members made by the other methods.

The manufacture and use of an electro-chemical delay time controlling device in accordance with the invention will now be particularly described, by way of example, with reference to the accompanying drawings in which.

Figure 1:
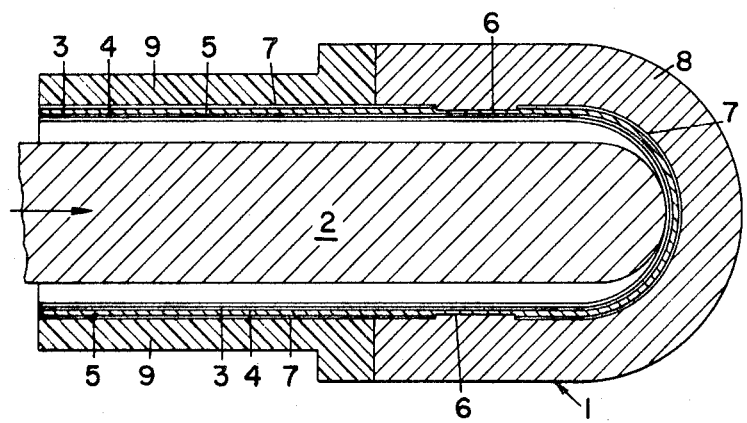
FIG. 1 is a longitudinal cross-sectional view of a timing tube and a spring-actuated control member.

The device as shown in FIG. 1 consists of a cylindrical tube 1 having one closed hemispherical end and being composed of a number of layers of different metals, and a rod 2 whose end lies within the tube 1 and thrusts internally against the closed end under the action of a spring (not shown).

The layers of metal forming the tube 1 are, in succession from the inner surface, a thin flash of copper 3, a very thin flash of gold 4, a layer of silver 5 having a weak circumferential section 6 of accurately known thickness, a second thin flash of gold 7 covering the silver layer except at the weak section 6, and a thicker outer layer of lead 8, extending from the closed end to a point beyond the weak section 6 of the silver layer 5. The remainder of the tube is enclosed in a plastic sleeve 9 which acts as an insulator and seal when, in operation, the tube is assembled as the anode of an electrolytic cell containing a solution of lead perchlorate and having a lead cathode.

Figure 2:
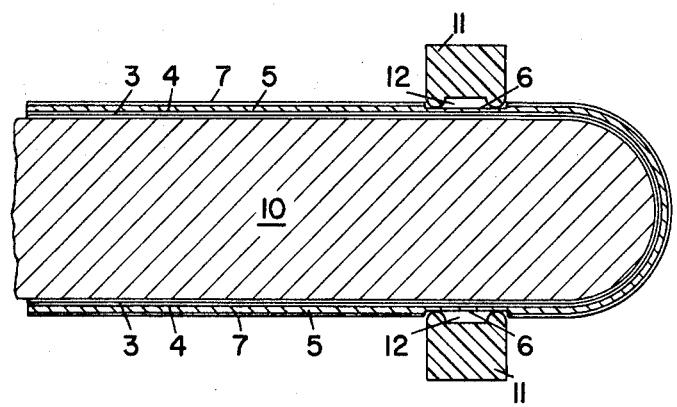
FIG. 2 is a longitudinal cross-sectional view of a partly completed tube in position on a former during manufacture.

FIG. 2 shows a cross-sectional view of the tube during manufacture in which the various metallic layers are successively deposited on a stainless steel former 10 having a polished grease-free surface. Too clean a surface on the former, that is, one from which the oxide layer has been moved, may lead to the formation of a strong bond between the former and the deposited metal and thereby cause difficulty in removing the tube from the former. A thin layer of copper 3 is first deposited on the former using a high current density of the order 100 amperes per square foot in order to avoid patchy deposition due to variations in conductivity over the steel surface caused by the oxide layer. The copper layer provides a good uniform surface on which is deposited a very thin flash of gold 4. Over the gold layer is deposited the silver layer 5. When the silver layer was reached a predetermined thickness a circumferential section 6 is blanked off by a plastic ring 11 shaped with an internal circumferential groove so that it encloses around the tube a continuous air space 12, from which the electro-plating solution is excluded by surface tension. Deposition of silver is then continued over the remainder of the tube until its thickness is approximately twice that of the blanked off section. A second thin flash of gold 7 is then deposited before the plastic ring 11 is removed.

The tube is then removed from its former in the following manner. The former is placed in a chuck and rotated, a roller whose axis is parallel to that of the former being applied to the outer surface of the tube with sufficient pressure to cause a small permanent deformation of the tube such that its wall thickness is slightly decreased and its internal diameter slightly increased. To avoid the possibility of axial distortion the roller is preferably applied first at the closed end of the tube and moved axially along the tube which is thus freed progressively from its outer end. The tube may then be slipped off the end of the former.

The outer layer of lead 8 (FIG. 1) is deposited by assembling the partly completed tube in an electrolytic cell, which may conveniently by the cell in which it will be used in operation, and depositing the lead by passing a current in the reverse direction, that is to say with the tube as cathode and the lead electrode as anode. In order to plate an accurate amount of lead onto the tube a number of cells are connected in series and a known current is passed. After a time at which it is known that about 95% of the required quantity of lead has been deposited one tube is removed and tested. This tube, in its cell, is assembled into a constant current device; current is then passed in the normal direction and the time for all the lead to be removed from the tube is observed. The point at which all the lead is removed and attack of the silver begins is marked by a steep rise in electro-motive force which may, if desired, be used through a triggering device to switch off the current and stop a timing instrument. The time required to complete the deposition of the exact amount of lead required is then calculated and the remaining tubes are finished accurately.

Figure 3:
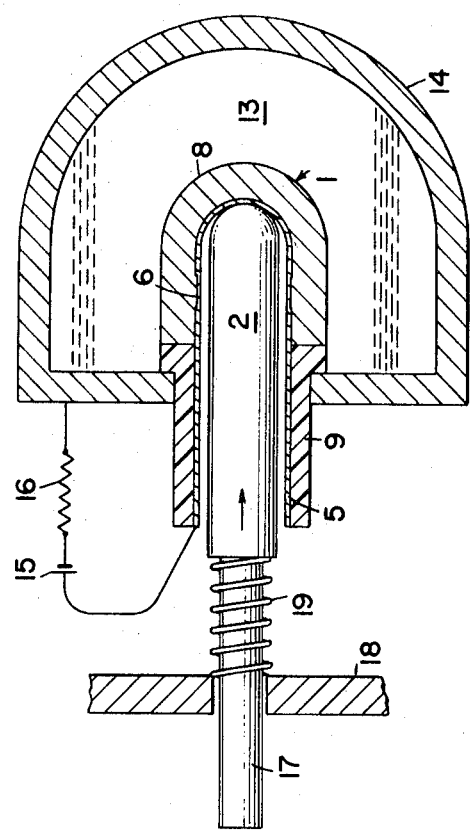
FIG. 3 is a diagrammatic drawing of the time controlling device showing the electrolytic cell and timing member in cross section.

As shown in FIG. 3, in operation the timing tube 1 is used as the anode in an electrolytic cell containing lead perchlorate 13 and having a lead cathode 14 which may conveniently form the walls of the cell. The tube 1 is insulated from the cell wall by the plastic sleeve 9 which also acts as a seal. The timing tube 1 shown in FIG. 3 is identical with that shown on a larger scale in FIG. 1 but details of the thinner layers of metal 3, 4 and 7 have been omitted from FIG. 3 owing to its smaller scale.

A controlled current is supplied to the cell by a battery 15 connected to the timing tube 1 which forms the anode of the cell and, through a variable resistance 16 to the lead cathode 14 which forms the wall of the cell. An actuating member 2 has at one end an extension 17 of reduced diameter which passes through a hole in a fixed plate 18. The other end of the actuating member 2 is held in a constrained position against the inner surface of the end wall of the timing tube 1 by a spring 19 which is retained in a compressed state between the plate 18 and the shoulder at the end of the extension 17 to the actuating member 2. When an electric current is passed through the cell the outer layer of lead 8 is gradually removed from the tube by electrolysis, the time taken to remove all the lead being proportional to the strength of the current. The whole of the lead layer will be dissolved before attack on the silver begins since there is a sufficient polarising potential difference between the two metals. When the lead has been completely removed silver begins to dissolve from the weak section 6 the attack being concentrated on this section since the remainder of the tube is protected by the gold layer 7 which is not attacked at all by the electrolyte. Silver continuous to be dissolved until breakage of the weak section 6 occurs thereby permitting the rod 2 to move in the direction of the arrow under the action of the spring 19 in order to bring about a desired action.

The inner gold layer 4 prevents the passage of electrolyte into the tube through pinholes which may be formed in the silver layer 6 when low current densities are used. The gold layer 7 also helps in this respect by concentrating the electrolytic attack at the narrow section 6 of the silver and hence raising the current density.

The copper layer 3 is not essential to the working of the device but provides a base for deposition of the gold layer 4 during manufacture as previously described.

The thickness of silver in the weak section 6 is preferably arranged to withstand at least four times the thrust exerted on the end of the tube by the rod 2, the thickness of the remainder of the silver layer 5 being about twice that at the section 6. The weight of lead in the layer 8 is preferably such that the time required for it to pass into solution is at least 25 times that required for the silver layer to break since inaccuracies in timing are largely due to variations in the time required to break the silver, An inaccuracy of 25% in the short time required for the silver to break will thus be reduced to a maximum inaccuracy of 1% in the overall time.

Variations in the delay time are obtained by varying the current passed through the cell and are selected by passing the current through a variable resistor or a series of fixed resistances which may be conveniently calibrated with a time scale. The practicable ratio of maximum to minimum time is about 1000:1. The high limit is imposed by the tendency of lead to polarise with evolution of oxygen at high current densities of more than about ½ milliamp/mm.² At low current densities, below about ½ microamp/mm.² the lead tends to be etched selectively at the grain boundaries, pitting and undercutting may occur causing pieces to fall off the anode thus shortening the time delay. Selective etching may also occur with silver at low current densities but current density during the electrolysis of silver is kept above the limit by concentrating attack on the small surface of the weak section.

In order to take full advantage of the range of delay times it is desirable to maintain a substantially constant current density during the electrolytic action since any large changes might be sufficient to produce a current density outside the limits. The thin cylindrical form of the tube is such that removal of metal from its surface causes relatively little change in surface area and a correspondingly small change in current density.

If variations in delay time are required to cover an even greater range the amount of lead in the outer layer of the tube may be varied without altering the thickness of the silver layer.

It is convenient to use a constant strength of electrolyte irrespective of the delay time required. A suitable concentration has a specific gravity of 2.0, a solution suitable for use at low temperatures since it does not freeze above −40° F. If the device is required for us at elevated temperature, for example under tropical conditions, it may be necessary to arrange that the tube be kept out of contact with the electrolyte until timing is required to begin since lead dissolves slowly in lead perchlorate at higher temperatures.

It has been found advantageous to add a small proportion of peptone to the electrolyte. In the pure electrolyte the electrolysed silver may form a sponge which could bridge the gap between anode and cathode. An addition of 0.01% of peptone serves to precipitate the silver and prevent this sponge formation. The addition of a higher proportion of peptone (0.1%) has the further advantage that it reduces the crystal size of the deposited lead giving an improved structure to the outer layer of the tube and thereby reducing the tendency of the lead to break up at low current densities.

A typical timing tube having a diameter at the outer gold layer of about 0.1 inch would have layers of approximately the following thicknesses Copper: .0007″
Inner gold: .000014″
Silver: .0015″ at weak section; .0030″ elsewhere
Outer gold: .00005″
Lead: to required weight Such a tube would be suitable for use with a device in which the spring actuated rod applies a thrust of up to 5 lb., the silver layer at the weak section being capable of withstanding a thrust of about 20 lb.

Of the alternative combinations of metals which may be used in forming the tube and gold layers 4, 7 may be made of another noble metal such as platinum or palladium without affecting the operation of the device. Alternatives for the lead or silver layers 8, 5 are in general less reliable in operation, for example copper may be used as an alternative to the silver layer, or if copper perchlorate or copper sulphate is used as electrolyte, as an alternative to the lead layer but the tendency of copper to corrode in the electrolyte in the presence of oxygen renders the timing somewhat less reliable than that achieved with silver and lead. Of the metals more electropositive than lead which might otherwise be suitable for use as the outer layer, most are difficult to electrolyse using a simple salt as electrolyte and the use of a more complex electrolyte such as a cyanide leads to unreliable timing owing to proportional solution of the various metals of the tube. It is possible to use nickel in an electrolyte of nickel sulphate but the limits of current density and therefore of delay time are much narrower than with lead.

What is claimed is:

1. A method of manufacture of a cylindrical electrochemical timing member which includes the steps of successively electrodepositing upon a cylindrical former a thin flash of copper, a flash of gold, and a known thickness of silver; sealing off a circumferential section of the tube by a non-conductive ring and thereafter electrodepositing a further thicknes of silver and a second flash of gold; removing the non-conductive ring and subsequently electrodepositing an outer layer containing an accurately determined mass of lead whereby the metal coated former when dissolved in an electrochemical bath after a predetermined delay interval will rupture at the circumferential section to actuate the timing member.

References Cited

UNITED STATES PATENTS

| | | | |
|---|---|---|---|
| 2,889,258 | 6/1959 | Failkoff | 204—9 |
| 2,029,011 | 1/1936 | Bart | 204—9 |
| 2,644,337 | 7/1953 | Sutherland et al. | 74—2 |
| 2,841,014 | 7/1958 | Bondurant | 74—2 |
| 2,741,182 | 4/1956 | Faust | 102—70.2 |

REUBEN EPSTEIN, Primary Examiner

U.S. Cl. X.R.

204—40, 9; 74—2